United States Patent [19]
Lutz

[11] 3,767,064
[45] Oct. 23, 1973

[54] TRAVELING WALKING BEAM CONVEYOR

[76] Inventor: David Edward Lutz, 330 Washington Ln., Carlisle, Pa. 17013

[22] Filed: June 20, 1972

[21] Appl. No.: 264,511

[52] U.S. Cl.................. 214/1 R, 198/219, 180/8 R
[51] Int. Cl............................................... B25j 3/00
[58] Field of Search.......................... 198/219, 218; 180/8 R, 8 C; 214/1 BB, 1 R

[56] References Cited
UNITED STATES PATENTS
3,658,171   4/1972   Kenzo Fukada..................... 198/219
3,537,540   11/1970   Zuppiger et al..................... 180/8 R Primary Examiner—Richard L. Aegerter
Assistant Examiner—Joseph E. Valenza
Attorney—John J. Byrne et al.

[57] ABSTRACT

A load transfer device for intermittently advancing a load in a straight path automatically. Means are provided for moving a load relative to the load transfer device and then for moving the entire load transfer device such that the distance the load is advanced is not limited by the length of the load transfer device.

6 Claims, 9 Drawing Figures

3,767,064

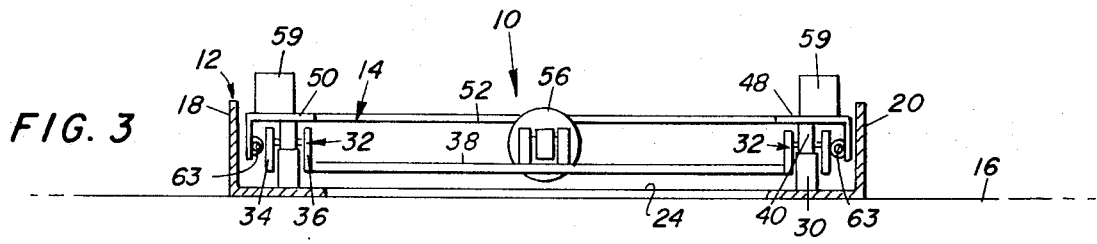
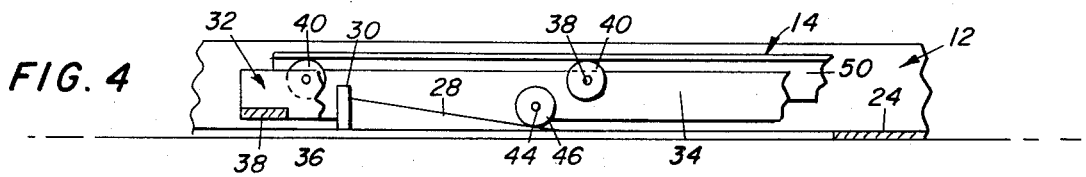
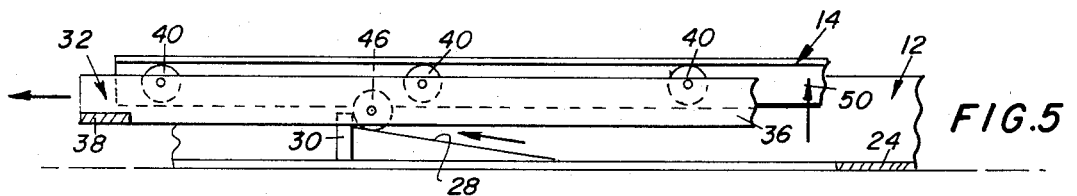
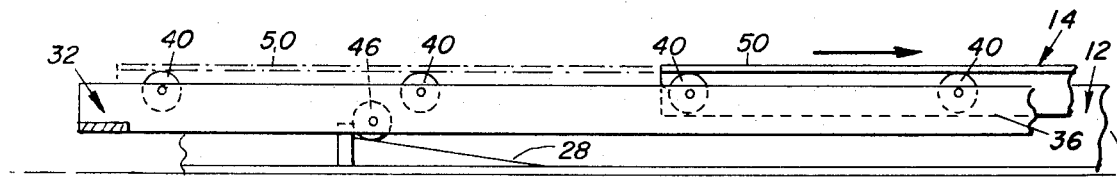
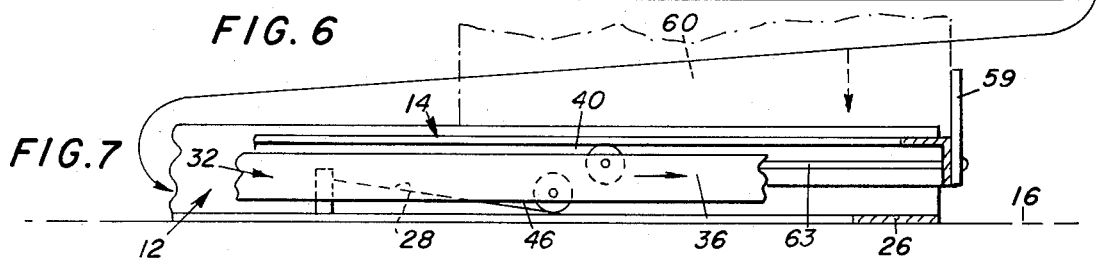
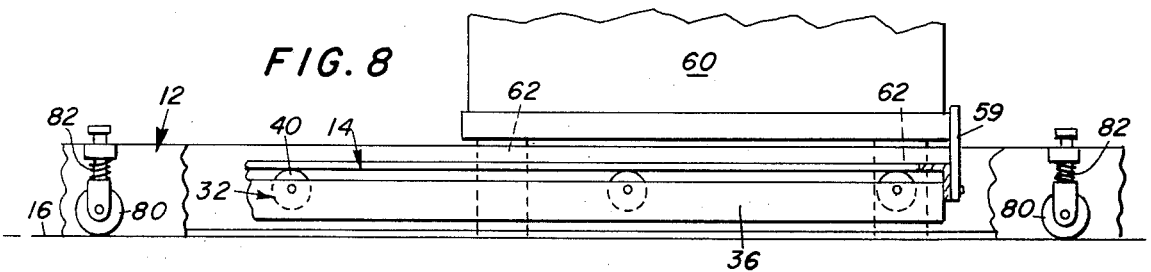
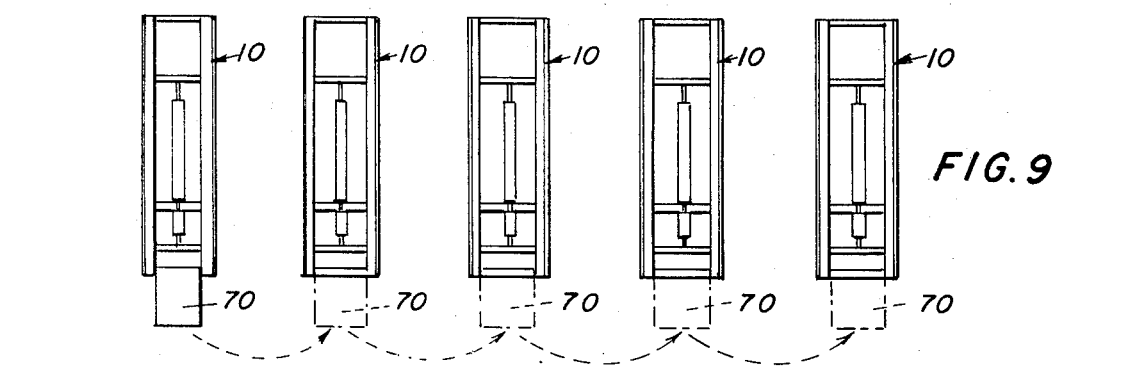

TRAVELING WALKING BEAM CONVEYOR

This invention relates to a load-transfer device and more particularly to a load-transfer device for automatically moving a load an indeterminate distance in a linear path across planar supporting surfaces such as warehouse floors, load docks or the like.

The load-transfer device of this invention is portable and is usable for moving a load across any planar surface including warehouse floors, loading docks, truck beds, relatively level roadways or the like and employs the principles utilized in walking beam conveyors. A standard walking-beam conveyor generally includes fixed or stationary elongated parallel beams mounted on a supporting surface or framework, and movable parallel beams interspaced with the fixed beams and mounted for movement vertically and longitudinally relative to the fixed beams. When the movable beams are in the lowermost position of their vertical movement path, the upper edges thereof are below the upper edges of the fixed or stationary beams. When they are in the uppermost position of their vertical movement path, the upper edges thereof are above the upper edges of the fixed beam. Therefore a load normally resting on the fixed or stationary beams is lifted off the stationary beams by the movable beams. When in the raised position, the movable beams are shifted linearly or longitudinally of the fixed beams to thereby advance the load relative to the fixed beams. The movable beams are lowered to again rest the load on the fixed beams. In summary, the movable beams by their vertical and longitudinal movement, advance a load from one point to another point on the stationary beams. The movable beams are retracted to the starting point while in the lowered position and the cycle is again repeated.

Conventional walking beams are generally permanently positioned for use with respect to a particular installation such as a furnace, truck bed, fixed-path assembly line or the like thereby limiting the use thereof to a particular function and physical area. More importantly in walking-beam conveyors, the distance over which a load can be transferred is limited by the actual length of the conveyor.

Therefore, it is desirable to provide a load-transfer device which is portable and, therefore, not limited to any particular application and which not only advances a load relative to own length but also is provided with means for advancing the conveyor per se, relative to its supporting surface, meaning that the distance over which a load is to be transferred is not limited by the length of the conveyor.

Therefore, it is an objective of this invention to provide a portable load-transfer device employing the principles of a walking-beam conveyor.

Further, is is an objective of this ivention to provide a walking-beam-type load transfer device which can move a load over a distance many times the length of the conveyor.

It is a further objective of this invention to provide a walking-beam-type load-transfer device which, once set into operation, will move a load an indeterminate distance, in a linear path until such time as it is de-energized.

It is another objective of this invention to provide a low-profile load-transfer device which can be inserted under loads, such as containers or the like, resting on standard-height pallet feet.

It is another objective of this invention to provide a load-transfer device which will automatically advance a load in a linear path without the necessity of guidance and constant supervision of an operator or attendant. This is in contradistinction to powered, wheeled caddies, forklift trucks or the like.

Another objective of this invention is to provide an elongated transfer device capable of handling and moving a row of aligned palletized loads simultaneously in a linear path.

More particularly, the load-transfer device of this invention is adapted for transporting loads supported on standard-height pallet feet and comprises an elongated base member, an elongated load-bearing member parallel to and mounted for vertical and reciprocatory movement relative to said base member. Drive means are provided for moving the load-bearing member in vertical and reciprocatory paths relative to the base member and means are provided for restraining movement of the load-bearing member for one direction of the reciprocatory movement to permit said base member to move relative to said load-bearing member. The load-transfer device is inserted under a load which is normally resting on a supporting surface such as a warehouse floor or the like. The load-bearing member is raised by the drive means to engage the underside of the load and to lift it off of the floor. The load-bearing member is then advanced in a linear path relative to the floor and relative to the base member which remains stationary. The load-bearing member is lowered to again test the load on the floor. The drive means is energized to reciprocate the load-bearing member in a reverse direction back to its original starting position. However, stop means are provided on the upper side of the load-bearing member for engaging the load which is now resting on the supporting surface. The weight of the load will be sufficient to prevent the load-bearing member from retracting. Therefore, it will be held stationary while the base member, which is not fixed to the supporting surface, is advanced a distance equal to the original advancement of the load-bearing member. At this time, the load-bearing member and the base member will be back in their original relative starting positions whereupon the cycle is repeated to again advance the load. The result is that as the load is advanced, the entire conveyor is also advanced hence the distance over which a load is carried is not limited by the length of the conveyor.

These and other objects of the invention will become more apparent to those skilled in the art by reference to the following detailed description when viewed in light of the accompanying drawings wherein:

FIG. 3 is a cross-section view taken along lines 3—3 of FIG. 2;

FIG. 4 is a cross sectional view taken along lines 4—4 of FIG. 2;

FIG. 5 is a fragmentary side view in elevation showing the load-bearing member being moved to the raised position;

FIG. 6 is a fragmentary side view in elevation showing the load-bearing member being advanced in a reciprocatory path;

FIG. 7 is a fragmentary side view in elevation showing the stop means for preventing movement of the load-bearing member during the retraction stage whereby the base member is advanced;

FIG. 8 is a fragmentary side view in elevation showing the load-transfer device of this invention positioned under a load which is supported by standard-height pallet feet; and FIG. 9 schematically illustrates the selective use of a single power unit with a plurality of load-transfer devices.

Figure 1:
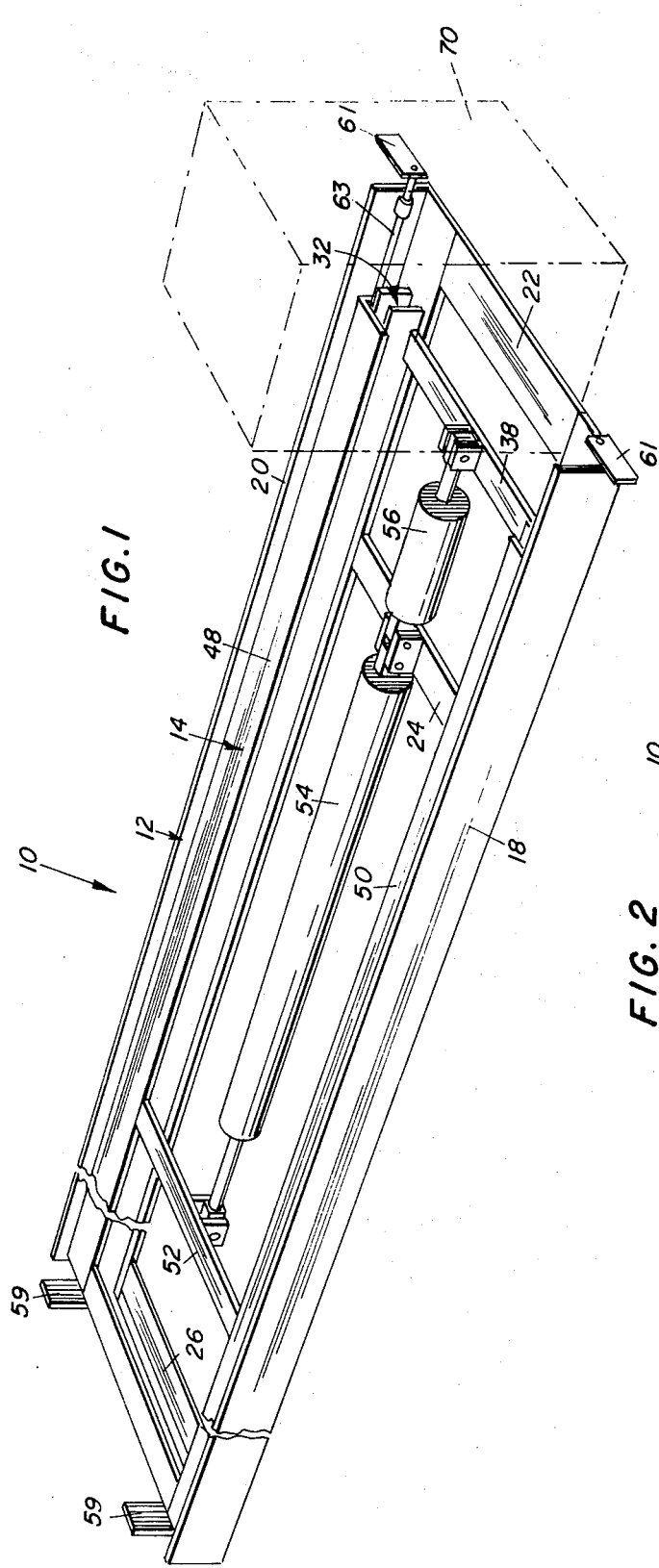
FIG. 1 is a perspective view of the load-transfer device of this invention.

Referring now to the drawings wherein like numerals indicate like parts, the load-transfer device of this invention is generally indicated by the numeral 10 and includes a base member 12 and a load-bearing member 14. The base member 12 rests on a planar supporting surface 16 such as a warehouse floor, loading dock, truck bed or the like. The base member 12, as shown, consists of a pair of elongated parallel angles 18 and 20 joined together in spaced relationship by transverse members 22, 24 and 26. Any number of transverse members may be provided as is necessary to lend sufficient rigidity to the base member. The alternative to this is that the base member may be of a solid planar sheet; however, the embodiment shown is designed to conserve materials and minimize the weight of the device. The base member 12 is not affixed to the supporting surface 16 and may be provided with runners for sliding movement thereof or with wheels as will be explained more fully hereinafter.

The load-transfer device of this invention operates very similar to a walking-beam conveyor. The load-bearing section 14, as mentioned earlier in the specification, moves in vertical and reciprocatory path relative to the base member 12. The entire assembly is adapted to be placed under a load supported on the surface 16 by standard-height pallet feet.

The vertical reciprocatory movement of the load-bearing member 14 will now be explained with particular reference to FIGS. 3 through 8. It is to be understood that the means shown for effecting this vertical and reciprocatory movement is a preferred embodiment; however, any other means for effecting similar movement such as eccentric cranks or the like may be employed. Ramps 28 are affixed to the base member in longitudinally tandemly arranged pairs and each includes a roller stop 30. A pair of longitudinally extending intermediate beams 32 overlie the beams 18 and 20 of the base member 12 and are each comprised of side plates 34 and 36 joined together in spaced relationship by the roller and axle assemblies described below. The intermediate beams 32 are joined by suitable transverse connecting members 38, the number of which depends upon the rigidity required. A first set of axles 44 are journaled in the side plates 34 and 36 of each of the beams 32 at longitudinally spaced positions generally corresponding to the location of the ramps 28. First or lower rollers 46 are journaled on each of the axles 44 and have peripheries which contact the surfaces of the ramp 28. A second set of axles 39 are journaled in the side plates 34 and 36 and generally lie in a plane above that of the first set of axles and have rollers 40 journaled thereon. Rollers 40 with peripheries lying above the upper edges of the plates 34 and 36 for movably supporting the load-bearing member 14. The load-bearing member comprises a pair of spaced beams 48 and 50 generally overlying and parallel to the intermediate beams. The beams 48 and 50 are joined by suitable transverse members 52, the number of which varies with the degree of rigidity required. It is to be understood that the load-supporting member can be of sheet material providing a substantially planar surface as opposed to the interspaced beams, the purpose of which is to conserve materials and minimize the weight of the device.

Piston and cylinder assemblies 54 and 56 are provided for effecting vertical and longitudinal reciprocatory movement of the load-bearing member 14. Cylinder 56 is affixed at one end to transverse member 44 which spans the beams 18 and 20 of the base member 12 and at the other end to transverse member 38, which joins intermediate beams 32. Cylinder 54 is attached at one end to the transverse member 24 of the base 12 and at the other end to the transverse member 52 of the load-bearing member 14. In the preferred embodiment, the stroke length of the cylinder 56 generally corresponds to the length of the ramps which is approximately 6 inches with a 1 inch elevation. The stroke length of cylinder 54 is not limited to any particular stroke length but the stroke length thereof determines the maximum distance a load can be moved during any particular cycle of operation. When the piston-cylinder assembly 56 is in the extended position, the intermediate member is in its leftmost position relative to the supporting base in FIG. 2 and is, therefore, in the raised position on the ramps as can best be seen in FIGS. 4 and 5. The cylinder 54 is then extended to move the load-bearing member to the right in FIG. 2 in a reciprocatory path. The cylinder 56 is then retracted to lower the load-bearing member after which the cylinder 56 is retracted. As will be described below, during retraction of cylinder 56, the load-bearing member 14 is held from movement while the base member 12 is drawn toward the load-bearing member. This completes one cycle of operation.

Stops 59 and 61 are provided at opposite ends of the movable load-bearing member 14. The stops are affixed to rotatable shaft mounted in member 14 and extend from one end to the other. The stops 59 are angularly displaced 90° relative to the position of the stops 61. By rotating the shafts 63, one or the other of the stops 59 or 61 may be placed in the raised position while the other is in the down position. The shaft can be rotated by merely gripping the stops on one of the ends and turning them in the direction of the arrows. Detents may be provided for maintaining the stops in either the up or the down position.

The load-transfer device of this invention is useful with loads supported by pallet feet of a standard height to permit the insert of forts of a forklift truck or the like. Referring to FIGS. 7 and 8, wherein a load is identified by 60 and the feet therefor by 62, it can be seen that the vertical height of the load-transfer device, when the load carrying member is in the lowered position, is less than the distance between the bottom of the load and the floor or supporting surface. When the load-carrying member is in the raised position, the total vertical height of the device is greater than the distance between the bottom of the load and the floor whereby the load is lifted from the floor. Referring again to the operating cylce of the invention and remembering that the entire device is slidably or otherwise movable across the supporting surface 10, the unit is placed under a particular load 60 to be moved. Stops 59 are then pivoted to the position shown in FIGS. 7 and 8 to engage a side of the load 60. Cylinder 56 is then extended to raise the load-carrying member 14 whereby the load is lifted off of the supporting surface 10. Cylinder 54 is then actuated to move the load-carrying member 14 and the load supported thereon to the right in a reciprocatory path as indicated by the arrows in FIGS. 2 and 6. At the end of the stroke length, the cylinder 56 is retracted to lower the intermediate member and the load-supporting member whereby the load is lowered to the floor 10. Upon retracting the cylinder 54, the load-bearing member 14 is prevented from moving back to its original position by the stops 59 engaging the load 60. Since the base member 12 is not fixed to the floor but is slidably thereon, it will be drawn forward relative to the load-supporting member 14 to the original relative starting position. This completes one cycle. It is to be noted that not only is the load shifted relative to the length of the load-transfer device but the entire device is shifted across the surface 10. A control unit 70 is provided on one end of the device and once energized, the device will continue to move automatically in an rectilinear path without need for an attendant.

In an alternate embodiment, the base member 12 may be supported on the floor 10 by means of spring-supported wheels 70, with the force of the springs 72 being sufficient to support the entire device above the floor when there is no load thereon. When the device is placed under load, however, the force of the springs will be overcome and the wheels will retract permitting the base member 12 to make firm contact with the floor 10.

The device can be made to operate in the reverse direction. In this regard, the stops 59 are pivoted to the down position and the device is inserted under the load until the stops 61, which are in the up position, engage a side of the load to be shifted. The load bearing member 14 is prevented from movement when the cylinder 54 is extended because of the engagement of the stops 61 with the load; therefore, the base member 12 is extended away from the load-bearing member 14. After the extending of the cylinder 54, the cylinder 56 is extended to raise the intermediate member and the load-bearing member 14 to lift the load off the floor. The cylinder 54 is then retracted to shift the load in a reciprocatory path to the left in FIG. 2. When the cylinders 54 and 56 are fully retracted, the load-carrying member 14 and the base 12 will be in their original relative starting positions, whereupon the cycle is repeated by the extending of the cylinder 54 which extends the base 12 away from the load-carrying member 14.

Figure 2:
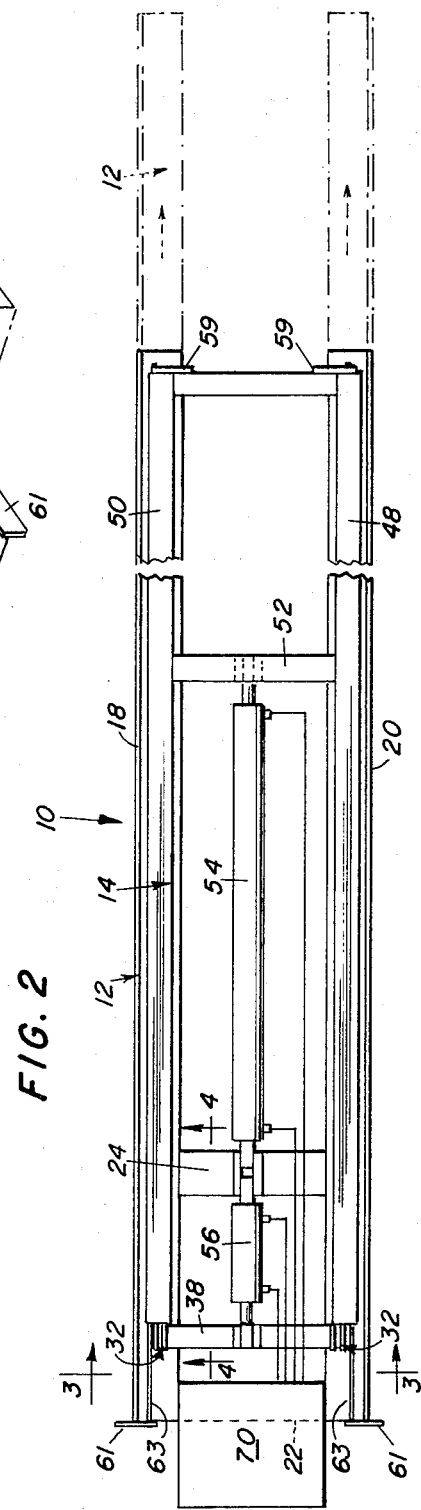
FIG. 2 is a plan view of the load-transfer device of this invention.

The power unit is a self-contained unit including a prime mover, such as an electric motor or gas-powered engine, a hydraulic pump, a source of hydraulic fluid, control valves and hydraulic conduits leading to the piston cylinder assemblies 54 and 56. The particular hydraulic system useful with this device is fully described and illustrated in my copending application Ser. No. 201,807, filed Nov. 24, 1971, entitled ARTICLE HANDLING SYSTEM. In that system, the valves are operated automatically to actuate the piston-cylinder assemblies in the proper sequence. The power unit as shown in FIG. 2 is mounted at one end of the load-transfer device; however, it can also be mounted at the other end.

Another very important feature of this invention is that the hydraulic power unit can be readily plugged in and removed from a load-transfer device merely by mounting it on one of the transverse members, for example 22 in FIG. 1, and by connecting the hydraulic conduits to the cylinders 54 and 56. As schematically illustrated in FIG. 9, a single hydraulic power unit can be used for a plurality of load-transfer devices. This is economically advantageous since the most expensive item of the entire device is the hydraulic power unit. Further, there are other obvious savings in manpower and time since one can deploy a plurality of load transfer devices at various points throughout the warehouse floor for example and can actuate each of the devices by merely placing a hydraulic power unit thereon with the aid of a hand cart or the like.

It can be seen from the foregoing that the distance over which the load-transfer device may move a load is not limited to the length of the load-transfer device. Further, it can be seen that unlike forklift trucks, power dollys, caddies or the like, a row of aligned palletized loads may be moved simultaneously.

In a general manner, while there has been disclosed an effective and efficient embodiment of the invention, it should be well understood that the invention is not limited to such an embodiment as there might be changes made in the arrangement, disposition, and form of the parts without departing from the principles of the present invention as comprehended within the scope of the accompanying claims.

I claim:

1. A load transfer device for moving loads supported on pallet feet across a planar surface comprising an elongated base member, an elongated load-bearing member parallel to and mounted for vertical and reciprocatory movement relative to said base member, drive means for moving said load bearing member in vertical and reciprocatory paths, and means for restraining movement of said load-bearing member for one direction of said reciprocatory movement to permit said base member to move relative to said load-bearing member.

2. A load transfer device as defined in claim 1 and including an intermediate member between said load-bearing member and said base member, first roller means on said intermediate member, ramp means on said base member and underlying said first roller means whereby said intermediate member is movable relative to said base member up and down said ramp means to raise said intermediate member and the load bearing member supported thereon relative to said base member.

3. A load transfer device as defined in claim 2 and including a second roller means on said intermediate member for supporting said load bearing member, and said drive means being operably connected to said intermediate member to move it up said ramp means to raise said load bearing member, and being operably connected to said load bearing member to move said load bearing member in a reciprocatory path on said second roller means and relative to said intermediate and base members.

4. A load transfer device as defined in claim 3 wherein said drive means comprises first and second fluid-actuated piston-cylinder assemblies, said first assembly being attached at one end to said base member and at the other to said intermediate member, and said second assembly being attached at one end to said base member and at the other end to said load-bearing member.

5. A load transfer device as defined in claim 4 wherein said means for restraining movement of said load bearing member comprises stop means at one end of said load bearing member for engaging a load supported on said surface.

6. A load transfer device as defined in claim 5 and including second stop means on the opposite end of said load bearing member.

* * * * *